Aug. 5, 1958

H. H. McADAM 2,846,599

ELECTRIC MOTOR COMPONENTS AND THE LIKE
AND METHOD FOR MAKING THE SAME

Filed Jan. 23, 1956

INVENTOR.
HARRY H. McADAM
BY
ATTORNEY

Aug. 5, 1958     H. H. McADAM     2,846,599
ELECTRIC MOTOR COMPONENTS AND THE LIKE
AND METHOD FOR MAKING THE SAME
Filed Jan. 23, 1956     3 Sheets-Sheet 3
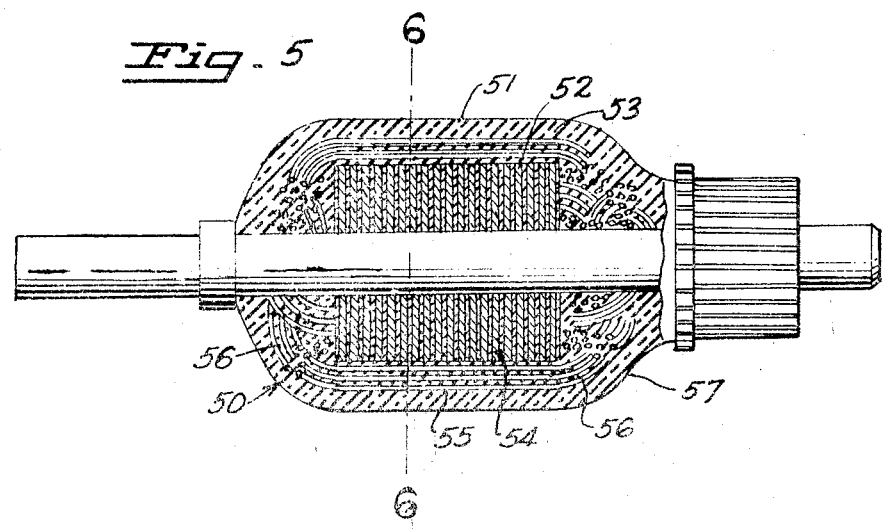
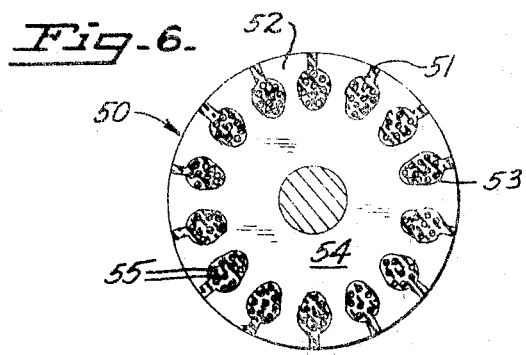
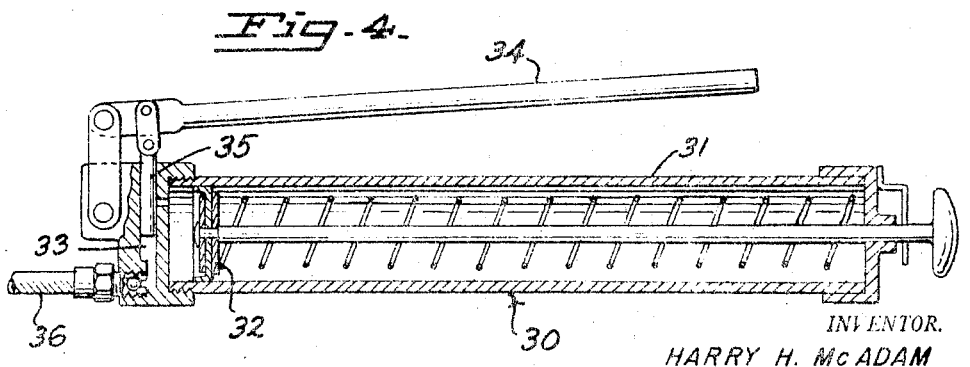
INVENTOR.
HARRY H. McADAM
BY
ATTORNEY

United States Patent Office 2,846,599
Patented Aug. 5, 1958

2,846,599

ELECTRIC MOTOR COMPONENTS AND THE LIKE AND METHOD FOR MAKING THE SAME

Harry H. McAdam, Springfield, Ohio, assignor to Wetmore Hodges, doing business as Wetmore Hodges and Associates, Redwood City, Calif.

Application January 23, 1956, Serial No. 560,841

10 Claims. (Cl. 310—43)

This invention relates to improvements in plastic-impregnated and coated devices, such as components of electric motors and pumps sealed by plastic to provide a pressure vessel, and the like. It also relates to a method for the manufacture of such devices. This application is a continuation-in-part of my application Serial No. 292,140, filed June 6, 1952, now abandoned.

One important problem solved by this invention relates to the impregnation and sealing of portions of an electric motor. For example, the stator may be so impregnated and sealed that it can be used in a motor-pump or motor-compressor as a pressure vessel or as an integral part thereof, without any separate outside shell. Such a construction not only eliminates an extra part and its weight and added size, but also aids in the dissipation of the heat that builds up within the motor by providing direct contact between the motor stator and the surrounding air. In order to be able to solve the problem of using a motor stator as part of the pressure vessel, all the laminations of the motor must be sealed together so that no gas can leak out from between them. Also, it is necessary to seal the wires of the stator windings so that no gases can leak out along these wires. The present invention has solved that problem and provides for fully sealed and impregnated motor parts.

Another problem solved by this invention occurs in small sized, high-speed electric motors of the so-called "universal" type. These motors are used in vacuum cleaners and in portable hand tools, such as electric drills and the like. They may be made for operation with either direct or alternating current and are characterized by having wire wound rotors, commutators and carbon brushes. Their rotational speed is usually about 8,000 to 12,000 R. P. M. Another type of much higher speed motor having wire wound rotors, extensively used by aircraft as actuator motors, rotate up to 25,000 R. P. M. The severe centrifugal stresses created in the rotor windings during rotation tend to cause the wire windings to move outwardly. When the motor is stopped, the rotor windings tend to move back inwardly. This wire movement is most troublesome because it causes the rotor windings to break down. The present invention impregnates, fills, encases, bonds and seals all wire windings together and to the rotor laminations. All wires are permanently locked together and anchored to the rotor, thereby completely eliminating any wire movement.

This invention has also solved the problem of protecting electric motors and the like from the effects of high humidity and of air-borne, corrosive, salt water vapors. Since the plastic sealant material is hard and tough, good protection from mechanical damage is also provided. Induction motors, that is, motors without commutators or brushes, can be completely protected. Both the motor stator and rotor can be made immune to liquids and vapors to the point where motor operation is unaffected by total immersion. In commutator brush type motors all parts except the commutator and brushes can be protected by this invention. This process first removes all air and moisture from the motor lamination interfaces and also all air and moisture from the wire winding interstices. Residual moisture content is preferably reduced below 25 parts per 1,000,000 prior to impregnation, filling, encasing, bonding and sealing with the thermosetting plastic or other sealant. The sealant is forced under high pressure into the motor parts to fill and completely occupy any and all previously evacuated and dried voids existing in the motor structure. Motors sealed according to the principles of the present invention may be operated under water, even under salt water. Radio sets, similarly sealed by an envelope around the corrodible parts, are better suited for operation in the tropics.

Another difficulty eliminated by this invention is the problem of high wind resistance or drag and the objectionable noise created thereby in conventional, high speed, wire wound, motor rotors. Ordinarily, the wire slots in the laminations and the portions of the wires that protrude beyond the two ends of the lamination stack cause considerable air drag and noise, and the slots tend to create a siren-like sound effect in addition to the drag. The irregularities and unevennesses of the wire coils and the uneven surface of the rotor both create an appreciable air disturbance at high rotational speeds. This invention makes it possible to eliminate all these irregularities, unevennesses, and roughness and provides a uniformly smooth, unbroken exterior surface which results in appreciably reducing the wind resistance and the noise.

Two principal problems had to be solved before the sealed motors of this invention could be produced successfully, and both these problems relate to the change in size (shrinkage) of the material which is used as the sealing agent.

For one thing, the heating and cooling of the metal parts caused expansion and contraction in the metal and in the sealing agent. The thermal coefficients of expansion of the iron laminations and the copper wire are necessarily different; so the heating and cooling of stators and rotors set up disruptive forces of tension and compression that tend to crack any sealing or bonding agent. Since it is not possible so to fill the plastic material as to match the thermal coefficients of expansion to both metals, the sealing agent contracted and expanded at a different rate from that of at least one metal, and strains were set up which would either crack the sealing agent or pull it away from the metal, in either case producing air passages. This problem has been solved by using a new material, claimed by me in application Serial No. 560,853, filed January 23, 1956. This material, within the temperature range in which the motor is used, has substantially the same temperature coefficient of expansion as the metals but also has a resiliency and toughness that resist the disruptive forces. This combination has been made more effective by doing most of the cure of the sealing agent at the median temperature of the motor—half way betweeen its non-operating temperature and its operating temperature.

However, thermal expansion and contraction is not the only factor that sets up strains and cracks and causes the sealing agent to pull away from the metal and form air passages. The "setting" of the thermosetting plastic materials that make suitable sealing agents is really a process of polymerization, which is the building up of long chains of linked molecules. Polymerization is an irreversible process which changes a semi-liquid to a hard, tough solid. The physical characteristics of the final plastic—its resiliency or lack of it, its ability to withstand shock, heat, wearing and so on—are determined in large part by the way it polymerizes. During polymerization (or curing, as it is sometimes called), plastics shrink, apparently due to a compression or condensation of the molecules when they become linked together. The net dilemma is that polymerization is a necessary step for bonding the sealing agent to the metal; and at the same time polymerization produces the undesirable effect of shrinkage, which disrupts the bond and causes leaks. The amount of shrinkage may be about 2% of the total volume of the plastic—an amount that has been fatal to the production of an air-tight pressure vessel because the plastic tends to pull away from the metal, to open air passages, and to produce crevices, cracks, and causes strains in the material that eventually produce more leaks.

The present invention solves the problem of polymerization shrinkage by a novel method: the parts to be sealed and the sealing material are maintained under high pressure during that portion of curing or polymerization in which shrinkage occurs. Additional sealing material is continuously added at a rate which exactly compensates polymerization shrinkage as it progresses, thereby substantially eliminating the shrinkage penalty.

Other objects and advantages of the invention will appear from the following description. It should be understood that the invention is not limited simply to the details described, for these details are given by way of example in order to show one preferred way of carrying out the principles of the invention, but they are not intended to limit the invention, which is stated in the appended claims.

In the drawings:

Fig. 4 is a view in section of one type of pressure device that may be used to force the plastic into the autoclave of Figs. 2 and 3.

Fig. 5 is a view in elevation and partly in section of an electric motor rotor made according to the principles of this invention.

Fig. 6 is a view in section taken along the line 6—6 of Fig. 5.

In general, the article of the invention is an electric motor or a component thereof (e. g., the stator or the rotor or both) or other types of similar electric devices, such as solenoids, in which the metal and the wires are bonded, sealed, and impregnated with a sealing agent, in a manner more fully described below. The method of the invention is broadly that of administering the sealing agent, which is a thermosetting polymer or mixture of thermosetting polymers, under considerable pressure and maintaining the pressure until after polymerization shrinkage has taken place, while adding additional material of the same kind to compensate for the shrinkage.

Two problems are concerned: The sealing of the stator laminations to each other and the sealing of the laminated assembly to the copper wires and other parts. The former problem is solved in accordance with the invention disclosed and claimed in my co-pending application, Serial No. 400,632, filed December 28, 1953, now abandoned. In general that application comprises interleaving a film or coated paper between successive laminations of the motor stator, the film or paper being faced with an uncured, thermosetting, adhesive resin containing its curing agent. Then the stator stack of interleaved laminations are brought together under high pressure at an elevated temperature and the resin interlayers are cured, bonding and sealing together the opposed metal lamination faces, with the result that fluid under pressure cannot pass between these laminations. At the same time, the bond is so tight that bolts are not necessary for holding the stack together. That invention preferably employed a paper interleaving member such as Hurlbut's 705–C rag-base paper, about 0.003-inch thick before being coated. The coating preferably is an epoxide resin (see the explanation below), such as Epon 1001, catalyzed with 6% dicyanamide. One paper that has proved very successful contained 68% resin and when coated was 0.006-inch thick.

Figure 1:
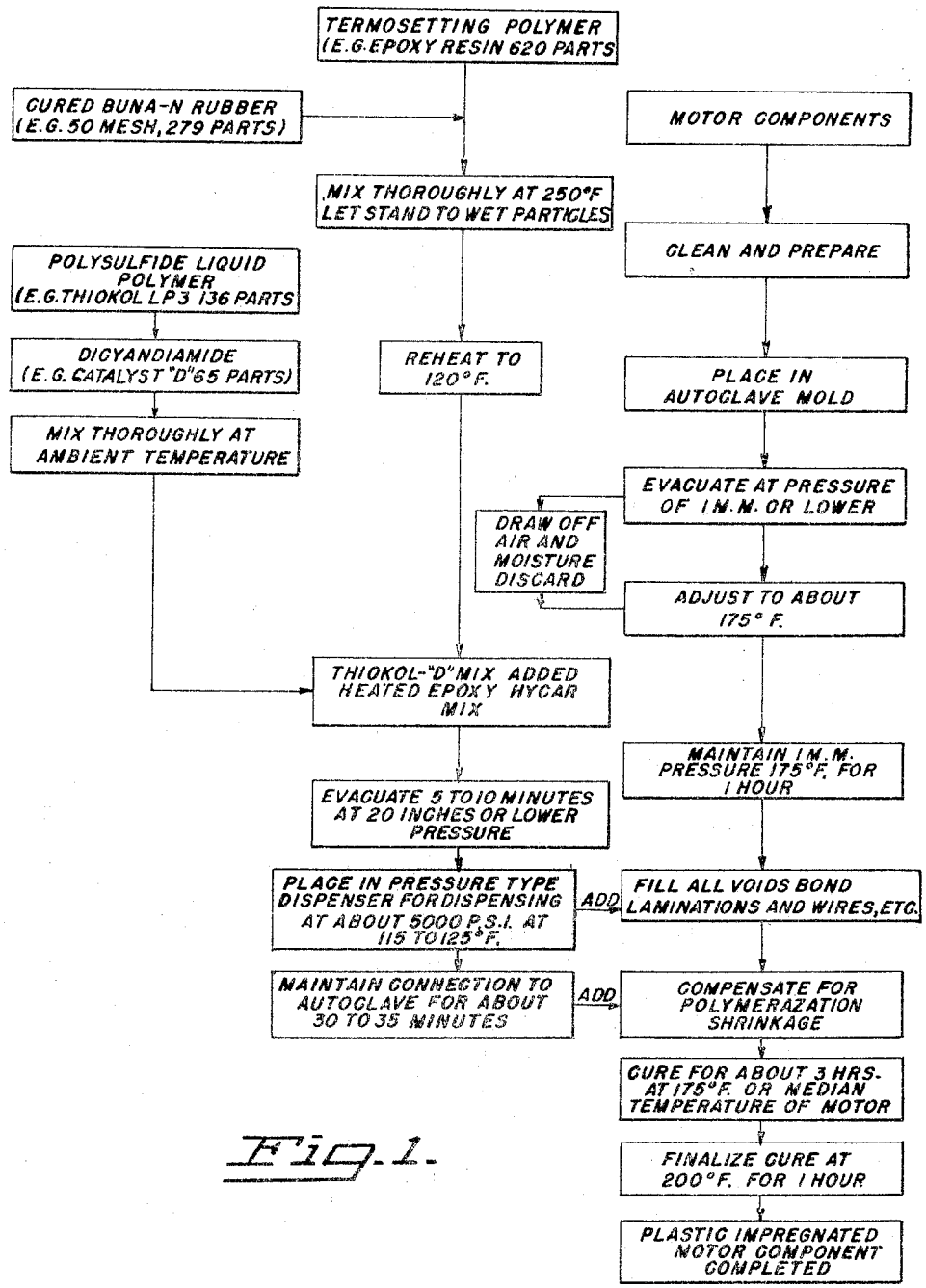
Fig. 1 is a flow sheet illustrating the method of this invention.

The selection of a suitable sealing agent for containing the stator and joining it to the wires is very important. It must be relatively hard, but it must be strong and not get glassy hard, for it must be able to withstand shock and not break should the motor be dropped or be struck by something. The sealing agent must have a coefficient of thermal expansion substantially the same, within a given temperature range, as that of the metals which are to be sealed. Finally, it must have a rubbery resiliency that will resist the disruptive forces due to differences in the thermal coefficients of expansion of the copper and iron without breaking, cracking or tearing. The only fully satisfactory material of which I am aware, after trying many, is that disclosed and claimed in my co-pending application, Serial No. 560,853, filed January 23, 1956, and the method will be described, by way of example, in connection with the use of this new material. Reference can be had to Fig. 1, which illustrates the preferred method on a flow sheet. However, the method may be practiced with other suitable sealing agents of the polymer type.

Basically, the sealing agent which bonds the laminated iron core and the copper wires together is a combination of an epoxy-type polymer, a Buna-N polymer, and a polysulfide polymer with a suitable curing agent. This composition is the one disclosed and claimed in my co-pending application, Serial No. 560,853, filed January 23, 1956.

The terms "epoxy polymer" and "epoxide resins" refer to the reaction products of polyfunctional halohydrins with polyhydric alcohols and/or phenols to produce glycidyl polyethers. Generally speaking, the most useful family of such resins is that formed by the reaction of epichlorhydrin with bisphenol A, resulting in glycidyl polyethers of dihydric phenol. The formula of this group is usually represented as

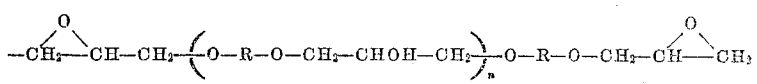

where R in the phenolic type of epoxide polymer represents the divalent hydrocarbon radical of the dihydric phenol, e. g.,

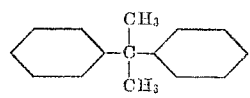

and where $n$ is an integer of the series 0, 1, 2, 3, etc. The name epoxy-type polymer, used in general trade, refers to the presence of epoxy groups of the type

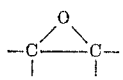

For further information reference may be had to Patent No. 2,500,600, issued March 14, 1950, to Bradley, and Patent No. 2,602,785, issued July 8, 1952, to Wiles and Elam. Several suitable polymers or resins of this type are available on the market, such as the resins manufactured by Shell Chemical Corporation and sold under the trademark Epon.

One of these is sold as Epon 828. At normal temperatures Epon 828 is a viscous amber liquid having an epoxide equivalent (grams of resin containing one gramequivalent of epoxide) of between 190 and 210. It weighs about 10.27 pounds per gallon, has a refractive index at 20° C. of 1.573, has a Gardner-Holdt viscosity of $Z_5$–$Z_6$ when solid, and has an equivalent weight (the number of grams of resin required to completely esterify one gram-mole of monobasic acid; e. g., 280 grams of $C_{18}$ fatty acid or 60 grams of acetic acid) of 85. Referring to the formula given above, $n$ is approximately 1.

Another, Epon 1001, is normally sold as solid flakes, having a melting point between 74° C. and 76° C., an epoxide equivalent of 450 to 525, a weight of 10.05 pounds per gallon, a refractive index at 25° C. of 1.595, and an equivalent weight of 145. A 40% solution in butyl carbitol at 25° C. has a Gardner-Holdt viscosity of C–G.

Buna-N rubber is the rubbery copolymer of butadiene and acrylonitrile often referred to by the trademark Hycar. It may contain various age inhibitors, stabilizers, fillers, and so on, all of which are well known in the art. I prefer to use it already fully cured and in a subdivided state, preferably in the nature of about 50 mesh.

With the epoxide resin and the Buna-N is combined a polythiopolymercaptan (see Patent No. 2,466,963, issued April 12, 1949, to Patrick and Ferguson). A preferred form of this compound is sold under the term Thiokol LP-3 by Thiokol Corporation. The Thiokol "LP" series is obtained by reacting sodium polysulfide with a mixture of 98% (mole) dichloroethyl formal and 2% (mole) trichloropropane. The resultant reductive cleavage of the polysulfide gives a liquid which can subsequently by oxidation be converted into a tough, rubbery solid. Preferably the polythiopolymercaptan has a viscosity of about 7 to 12 poises. (For further information about the Thiokol LP series, see the article "Polysulfide Liquid Polymers" by J. S. Jorczak and E. M. Fettes in Industrial and Engineering Chemistry, vol. 43, No. 2, February 1951, pp. 324–328.)

A preferred composition and its preparation follows:

Part A

| | Grams |
|---|---|
| Epoxy-type polymer (Epon 828) | About 620 |
| Buna-N (as above, 50 mesh) | About 279 |

These two elements are mixed together hot, being heated in an oven to between 225° F. and 275° F., preferably about 250° F. After mixing, they are preferably allowed to stand several hours to allow the fine 50-mesh Buna-N particles to become thoroughly wetted by the liquid epoxy.

Part B

| | Grams |
|---|---|
| Liquid polythiopolymercaptan ("Thiokol" LP-3) | About 136 |
| Catalyst (aromatic or aliphatic amine such as dycyandiamide, sold as "Catalyst D") | About 65 |

These two elements are mixed together at the ambient temperature. Part A is then reheated to between about 115° F. and 125° F., and part B is added to part A and mixed thoroughly for about 5 minutes. This mixture is then evacuated to a pressure below 20 inches of vacuum for about 10 minutes to remove any moisture or noncondensable gases. Pot life of the mixture at 120° F. is about 3 hours, and up to this point about 15 minutes have been consumed.

The formulas in the preceding example appear to give the best results in electric motor applications. Proportions may be varied for various applications, but for electric motor encasement etc., I have found it best to keep the proportions within the following ranges, by weight:

| | Parts |
|---|---|
| Epoxy-type polymer (Epon 828) | About 50–60 |
| Buna-N | About 20–30 |
| Liquid polythiopolymercaptan | About 10–15 |
| Catalyst (e. g. dicyandiamide) | About 5.25–6.30 |

The subdivided Buna-N has a great effect on the resiliency of the finished product, for best results it is well to use about as much as can be completely wetted by the epoxy when mixed at 250° F., which is about the middle of range indicated above. Too little Buna-N rubber below the lower end of the range reduces the resiliency and this reduction may result in cracking of the solid when subjected to thermal conditions like those existing in electric motors.

The polythiopolymercaptan acts to soften the epoxy polymer so that it can conform to the resiliency factor supplied by the Buna-N. Too little of the polythiopolymercaptan will result in a matrix body lacking flexibility permitting deflection of the rubber particles, and mechanical and thermal cracking may result. However, polythiopolymercaptans are subject to cold flow, and too much of this ingredient in the presence of the hard epoxy polymer tends to result in deformation of the plastic encasement. Balancing these several factors, as shown in the foregoing examples, results in the most stable product.

The polythiopolymercaptan acts to soften the epoxy polymer so that it can conform to the resiliency factor supplied by the Buna-N. Too little of the polythiopolymercaptan will result in a matrix body lacking flexibility permitting deflection of the rubber particles, and mechanical and thermal cracking may result. However, polythiopolymercaptans are subject to cold flow, and too much of this ingredient in the presence of the hard epoxy polymer tends to result in deformation of the plastic encasement. Balancing these several factors, as shown in the foregoing examples, results in the most stable product.

In the meantime the motor element is prepared. For example, suppose that a motor stator is to be processed. Preferably it is placed in an autoclave 10 (see Figs. 2 and 3) for two reasons. First, so that all air and moisture are withdrawn from the motor stator structure 11 by heating and evacuation. The heating may preferably be done electrically by passing a current through the stator windings 12 by means of the electric plug 13. At the same time a high vacuum pump (not shown) may be attached to an autoclave fitting 14 to exhaust the autoclave 10 and the stator structure 11. The stator temperature may be raised to 170° F. or higher while the vacuum pump (not shown) maintains a pressure of preferably under 1 mm. mercury, absolute.

Figure 2:
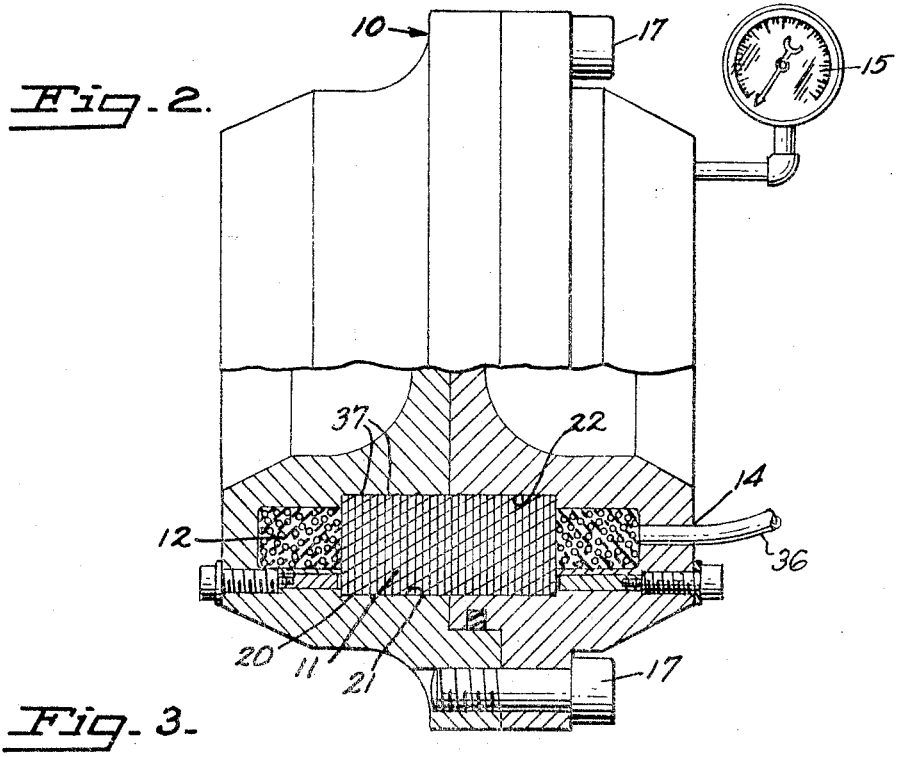
Fig. 2 is a view in side elevation and partly in section of an autoclave for sealing a motor stator according to the principles of the present invention, showing also the stator.
Figure 3:
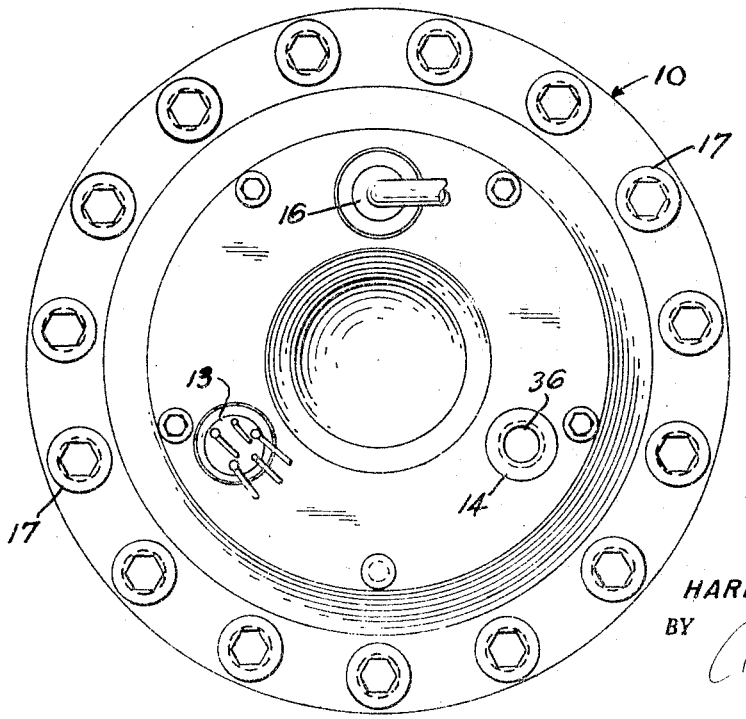
Fig. 3 is a view in end elevation of the autoclave of Fig. 2.

The second purpose of the autoclave 10 is to provide a very strong enclosure for high pressure plastic injection and impregnation of the stator structure at preferably over 5000 p. s. i. g. As shown in Figs. 2 and 3, the autoclave 10 may be held together tightly by a plurality of bolts 17, so that its cavity 20 fits around the stator 11, with a relatively small clearance area between the outside walls 21 of the stator and the autoclave 10 and with substantially no clearance between the stator bore 22 and the autoclave 10.

The thermosetting plastic sealing material is then forced under high pressure through the autoclave fitting 14 and thence into the evacuated stator structure 11 contained inside the autoclave cavity 20. Since this cavity 20 is shaped to exactly fit the stator 11, it acts as a precise, high-pressure mold. A high-pressure hydraulic pump may be used to force the thick, semi-liquid sealant into the autoclave cavity at a pressure in excess of 2000 p. s. i. g. and force it to enter and fill all of the stator structure voids. One simple hand pump that has been used successfully for this purpose is an ordinary automotive-type grease gun 30 shown in Fig. 4. This pump 30 consists essentially of a large cylinder 31 and large piston 32 which acts as a sealant reservoir and also acts to feed the sealant into a much smaller cylinder 33. A simple lever arrangement 34 enables the small piston 35 to produce pressures upward of 5000 p. s. i. g. easily. These very high pressures, at least in excess of 2000 p. s. i. g., are necessary to force the uncured, semi-liquid sealant through the conduit 36 and to enter and solidly fill all stator structure voids including those small interstices between adjacent parallel wires formed into bundles which pass through the stator wire slots and also along the wires 12, so that there is a complete pressure seal.

The plastic mix at 120° F. in the pump is formed into the autoclave at 175° F. The autoclave starting pressure is 1 mm. which is rapidly raised to about 5000 p. s. i. g. in about 5 minutes. The forcing in of the plastic mixture into the evacuated autoclave 10 and throughout the stator 11 raises the pressure in the autoclave until a level of about 5,000 to 5,300 pounds per square inch is reached, as indicated on the pressure gauge 15, which is attached to an autoclave fitting 16. The pressure is maintained at this value for about 30 minutes after the autoclave and stator structure have been completely filled, or until the gelation period of the mix has been reached. During this period additional plastic material is constantly added, because the polymerization shrinkage must be compensated for at this time in order to insure complete impregnation, filling, bonding, sealing, and encasement of the object being treated. This very important step is what solved the polymerization shrinkage problem and made plastic-sealed motors possible.

The autoclave is normally maintained at 170° F. to 180° F. for a period of 3 hours after the 30 minutes' gelation period to complete plastic polymerization. After curing, the part is removed; it is now a tough, brown, hard, rubbery solid, impervious to acids, Freon, oil, water, salt water and most other liquids.

The supply of plastic (e. g., the gun 30) is then removed, without loss of pressure, and further curing is carried on at about the median temperature to which the object being treated will be exposed. For example, a motor which will be varied in temperature between room temperature and about 250° F. will have a median temperature of about 175° F. In this instance the curing may be carried on at 175° F. for about three hours, during which time the pressure falls somewhat. By being cured at about 175° F. the plastic will have its greatest stability at this temperature and therefore cooling or heating will cause a change based on this temperature as normal. Any slight difference in the temperature coefficient of expansion of the metal and the plastic is therefore minimized. If curing were carried out at one extreme temperature, then this difference would be maximized at the other extreme temperature. Therefore, curing at the median range helps prevent checking and cracking.

After most of the cure is completed the temperature may then be raised slowly to 200° F. (or whatever temperature the manufacturer specifies) and maintained there for one hour to finalize the cure. Then the mold may be cooled to room temperature and the impregnated stator removed.

It will be found that the plastic material under the high pressure has been forced between and has coated the wires 12, has filled the winding slots, and has thoroughly bonded together itself and all the metal parts, so that all voids however small are filled solid. The plastic is immune to water, oil, salt water, most acids and many other materials, and therefore protects the motor against harsh atmospheric conditions and against immersion in water, sea water, and other liquids such as fuels, solvents and refrigerants.

The plastic seals all the wires 12 rigidly into place and fills the voids between the laminations and around the wires, so that the motor stator 11 (or electric motor or other object being treated) may be used as a pressure vessel without having to provide any outer shell, and so that the wires 12 are protected against mechanical force and internal vibration, and so that there will be no internal voids to retard the flow of heat from the motor.

Figs. 5 and 6 show illustrative views of a motor rotor 50 which has been processed according to the method of the present invention. Pressure sealing of the motor rotor is not a requirement; therefore no plastic sheet is interleaved between the iron laminations of the rotor. Plastic 51 has been forced in between the laminations 52 (the thicknesses of the laminations 52 and the plastic interfills have been exaggerated for purposes of illustration; normally there will be many more laminations and they will be much thinner; the plastic interfills will be thinner than thin paper) and the plastic 51 has also filled the voids in the wire slots 53, so that the outer surface of the core 54 is substantially smooth, the plastic 51 lying flush therewith. The spaces between the wires 55 are filled, and the projecting portions 56 of the wires are encased so that the outer surface 57 of the plastic encasement around the wires is also smooth. This smoothness is what has solved the air and fluid drag problem and the noise problem.

The plastic 51 bonds the wires 55 to the core 54 both to prevent relative movement between the wires 55 and the core 54 and to provide a continuous path that conducts heat from the wires to the core, so that there are no dead-air spaces or other non-conducting voids. Moreover, the wires 55 and the laminations 52 are protected against motion disturbances and chemical activity by the plastic 51.

Since the plastic 51 is resilient and has a thermal coefficient of expansion close to that of the core 54 and the wires 55, it does not break or check or crack away from the metal during use; and since it was cured at about midway between the rest temperature of the motor and its operating temperature, whatever tendency there may be to expand or contract at a somewhat different rate is minimized.

This invention involves filling all the voids of the stator or rotor, as mentioned, so that, for example, a stator produced according to this invention can be used as a pressure vessel and, even under high pressure, will not leak fluids retained therein. For that reason, this invention is quite different from the prior art, where "coatings" were applied to motor stators or rotors. The prior art usually employed a type of varnish, shellac, or plastic solution that coated the wires or metal parts but did not fill the voids between the wires or parts, whether the coating was sprayed, dipped or applied inside a pressure vessel. Such coating materials were usually drained off after application, leaving only a thin film on the motor element. The present invention has no relation to these prior art processes, because in the present invention the plastic is embedded around the wires and between the laminations, solidly filling all the voids, so that it completely closes and seals both the outer surface and the interior parts of the structure.

Stators made according to the present invention have been tested under liquids and have held 350 p. s. i. of gases or vapors without leakage. The iron stacks were tested at that pressure prior to winding, and were tested again after winding and impregnation. Operating pressures of 215 p. s. i. have been used at temperatures of 222° F., with Freon 12 as the refrigerant, and there has been no leakage after prolonged tests.

I claim:

1. A motor stator able to serve as a pressure vessel when its ends are closed, including in combination a laminated metal core and wire windings associated with said core, said wire and said core being made of different metals having different thermal coefficients of expansion; and a thermosetting plastic comprising a mixture of epoxy resin, rubbery butadieneacrylonitrile copolymer, and rubbery polythiopolymercaptan, said plastic filling the voids in said core between laminations and encasing the wires and bonding them substantially immovably together, said plastic being cured in situ and having inherent adhesive properties associated with a tough rubbery resilience that prevents said plastic from cracking and separating from the metal constituents when said stator is subjected to repeated heating and cooling during alternate periods of use and non-use when said metals expand and contract at different rates tending to cause fracture and separation.

2. The stator of claim 1 in which said plastic material has its normal state, from the standpoint of thermal expansion and contraction, at approximately the median temperature between the rest temperature of said stator and its operating temperature.

3. The stator of claim 2 in which said plastic material is cured at said median temperature.

4. A motor stator able to serve as its own pressure vessel when its ends are closed, including in combination a core made up of a series of laminations of a first metal, said core being provided with slots, and having wire windings of a second metal in said slots and projecting beyond the ends of said core, said second metal having a coefficient of expansion different from that of said first metal; and a solid homogeneous fill of in-situ-cured thermosetting plastic comprising a homogeneous mixture of epoxy resin, rubbery butadiene-acrylonitrile copolymer, and rubbery polythiopolymercaptan, encasing the wires, filling the voids between the wires, binding the wires immovably together and to said core both inside and outside said slots, filling said slots flush with the surface of said core, and sealing the space between adjacent laminations against leaking under pressures of 350 p. s. i., said plastic resisting the disruptive forces caused by the differences in thermal expansion of said metals.

5. The stator of claim 4 wherein said epoxy resin comprises the major portion of said plastic mixture.

6. A method for impregnating and sealing an electric motor stator and the like so that it can serve as a pressure vessel, comprising forcing into and around said stator under pressures exceeding 2000 p. s. i. g. an uncured polymerizable thermosetting plastic containing curing agent, maintaining said pressure while curing said plastic and while forcing in, under said pressure, additional plastic in an amount sufficient to compensate for polymerization shrinkage.

7. The method of claim 6 wherein the curing of said plastic is carried on mainly at a temperature approximately midway between the normal operating temperature of said stator and its normal non-operating temperature.

8. The method of claim 6 wherein said pressure is in the range between about 5000–5500 p. s. i. g.

9. A method for impregnating and sealing an electric motor stator for use as a pressure vessel, comprising placing said electric motor stator in a pressure vessel, adding thereunto, under a pressure exceeding 2000 p. s. i. g., a thermosetting plastic comprising a mixture of liquid uncured epoxy resin, subdivided cured rubbery copolymer of butadiene and acrylonitrile, and liquid uncured polythiopolymercaptan, said mixture including the curing agents for its uncured components, maintaining the supply of said plastic under said pressure until after polymerization shrinkage has taken place, so that additional plastic is forced into said stator to make up the volume lost by said shrinkage, said additional plastic simultaneously being cured, and completing the cure of all said plastic.

10. A method for impregnating and sealing an electric motor stator or the like, comprising placing said electric motor stator in a pressure vessel, adding thereunto, under a pressure exceeding 2000 p. s. i. g., a thermosetting plastic comprising a mixture of about 50 to 60 parts by weight of a glycidyl polyether of a dihydric phenol, about 20 to 30 parts by weight of a subdivided rubbery copolymer of butadiene and acrylonitrile, about 10 to 15 parts by weight of a liquid polythiopolymercaptan, and about 5.25 to 6.30 parts by weight of dicyandiamide; maintaining the supply of said plastic under said pressure until after polymerization shrinkage has taken place, so that additional plastic is forced into said motor stator to make up the volume lost by said shrinkage, said additional plastic simultaneously being cured; and completing the cure of all said plastic.

References Cited in the file of this patent

UNITED STATES PATENTS

| | | |
|---|---|---|
| 1,270,969 | Parker | July 2, 1918 |
| 1,502,343 | Macpherson | July 22, 1924 |
| 1,921,112 | Apple | Aug. 8, 1933 |
| 2,318,786 | Korte et al. | May 11, 1943 |
| 2,340,905 | Sigmund et al. | Feb. 8, 1944 |
| 2,648,018 | Meier | Aug. 4, 1953 |

OTHER REFERENCES

"Ethoxylines," article by Preiswerk et al. in Electrical Engineering for July 1949, pp. 78–81; 164, 166.